(12) United States Patent
Brinker et al.

(10) Patent No.: US 8,225,105 B2
(45) Date of Patent: Jul. 17, 2012

(54) METHOD AND APPARATUS FOR VERIFYING INTEGRITY OF COMPUTER SYSTEM VITAL DATA COMPONENTS

(75) Inventors: Michael J. Brinker, Rochester, MN (US); Rick D. Hemmer, Rochester, MN (US); Daniel M. Hursh, St. Charles, MN (US); Jeffrey M. Uehling, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1296 days.

(21) Appl. No.: 11/837,663

(22) Filed: Aug. 13, 2007

(65) Prior Publication Data

US 2009/0049309 A1 Feb. 19, 2009

(51) Int. Cl.
*G06F 11/30* (2006.01)

(52) U.S. Cl. ........................................................ 713/189
(58) Field of Classification Search ................... 713/189
See application file for complete search history.

(56) References Cited

U.S. PATENT DOCUMENTS

| | | | |
|---|---|---|---|
| 7,487,316 B1 * | 2/2009 | Hall et al. ...................... 711/168 |
| 7,512,979 B1 * | 3/2009 | Koike et al. ..................... 726/23 |
| 7,627,765 B2 * | 12/2009 | Nakamura et al. ............. 713/181 |
| 2005/0004876 A1 * | 1/2005 | Movalli et al. .................. 705/64 |
| 2006/0095795 A1 * | 5/2006 | Nakamura et al. ............. 713/193 |
| 2007/0183080 A1 * | 8/2007 | Abe et al. .................... 360/77.04 |
| 2008/0092235 A1 * | 4/2008 | Comlekoglu .................. 726/22 |
| 2008/0256363 A1 * | 10/2008 | Balacheff et al. ............. 713/187 |

OTHER PUBLICATIONS

J. D. Strunk, et al., "Intrusion Detection, Diagnosis and Recovery with Self-Securing Storage" (CMU-CS-02-140, Carnegie Mellon University, May 2002).
A.G. Pennington, et al., "Storage-based Intrusion Detection: Watching storage activity for suspicious behavior" (Proceedings of the 12th USENIX Security Symposium, Aug. 2003).

* cited by examiner

*Primary Examiner* — Kambiz Zand
*Assistant Examiner* — Aubrey Wyszynski
(74) *Attorney, Agent, or Firm* — Roy W. Truelson (57) ABSTRACT

Vital data components of a computer system are protected by a mechanism for detecting unauthorized alteration, preferably in the form of digital signatures to detect unauthorized alteration. A vital data validation mechanism is provided to verify that vital data modules have not been tampered with. The vital data validation mechanism verifies the current state of each vital data module, preferably by decrypting the digital signature. The validation mechanism also checks an alteration log to verify that no alterations have been made to the corresponding memory locations. The second verification is intended to detect whether a vital data module has been altered temporarily, and then restored to its initial state.

21 Claims, 6 Drawing Sheets

METHOD AND APPARATUS FOR VERIFYING INTEGRITY OF COMPUTER SYSTEM VITAL DATA COMPONENTS

FIELD OF THE INVENTION

The present invention relates to digital data processing, and in particular to methods and apparatus for preventing and detecting unauthorized tampering with computer systems.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which form a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but using software with enhanced function, along with faster hardware.

Almost all modern general purpose computer systems support some form of sharing of information with other computer systems, as via the Internet or some other network, and almost all large systems support multi-tasking on behalf of multiple users, in which multiple processes are simultaneously active, and computer system resources, such as processor and memory resources, are allocated among the different processes. Often, the actual users are physically remote from the computer system itself, communicating with it across a network. In the case of the Internet, the actual users may communicate with the computer through multiple intermediate computer systems and routers, and be so remote that they are difficult to identify.

Making the capabilities of computer systems widely available provides great benefits, but there are also risks which must be addressed. In such an environment of multiple users, some of them remote, sharing resources on a computer system, and communicating with other computer systems which may similarly share resources, data security and integrity are a significant concern.

If the capabilities of a system are to be made widely available, it is impractical to vet all persons using the system's capabilities. It must be assumed that it will be possible for unscrupulous persons to use the system, and the system should therefore be designed so that those who use it can not compromise its data integrity or access unauthorized data. Widely available systems therefore have various protection mechanisms, whereby the operations a user can perform are limited, data is isolated, and users are protected from one another. However, it is generally necessary to allow some individual or relatively small group of individuals greater access to the system for purposes of performing maintenance operations, administering system access by others, and so forth. Special access mechanisms exist for this purpose. Thus, an entire hierarchy of access mechanisms may exist for accessing different capabilities of a system by different classes of users.

In theory, these various access mechanisms for different users and associated security and protection measures protect the system and its data. However, these mechanisms are enormously complex. It is difficult to design systems of such complexity which are foolproof. Human ingenuity being what it is, unscrupulous persons all too often find ways to defeat the protection mechanisms. Those skilled in the art of computer security and data integrity therefore seek new and improved mechanisms for system protection. As these new and improved mechanisms are developed, interlopers likewise seek ways to thwart the improved protection mechanisms. Thus, an arms race of sorts exists between those who seek to protect computer systems and those who seek to defeat that protection, requiring continuing improvements to computer system protection mechanisms. Often, it is the anticipation of the security exposure which requires the greatest skill on the part of those who protect computer systems; the fix may be relatively straightforward once the exposure is understood and appreciated. It can not be expected that any single new development will, once and for all, put an end to attempts to defeat computer system protection mechanisms, but any development which makes it more difficult for the interloper has potential value.

One form of protection mechanism is a mechanism which leaves evidence of a security or integrity breach. Such a mechanism does not directly prevent the interloper from accessing or altering unauthorized data, but leaves telltale evidence of tampering, so that remedial action may be taken and/or the interloper may be discovered and apprehended. Various types of such mechanisms have been known for centuries. For example, the wax-sealed envelope did not prevent anyone from opening and reading its contents, but provided visible evidence that the contents had been read. Analogous mechanisms exist on modern computer systems to provide evidence of unauthorized access.

In particular, it is sometimes desirable to detect whether some piece of data has been altered. The data could be, for example, an executable code module which performs some important low level function, although it could be something other than executable code. Various low level executable code modules are responsible for enforcing security and data integrity in a large system, but if these modules themselves can be altered, then of course the integrity of the system is compromised. Such an executable code module or other vital data can be protected by use of a digital signature. Typically, the digital signature is some data which is derived from the executable code module and/or its attributes according to a known function, and then encrypted using a private encryption key according to a public/private key algorithm. The known function used to derive the data to be encrypted into the key is generally referred to as a hashing function, indicating that a relatively large number of bits are reduced to a smaller number of bits for convenience of encryption, although bit reduction is not strictly necessary, and if the data being protected is sufficiently small, the protected data itself could be encrypted directly (i.e., the hashing function could be the identity function). Using a digital signature, it is possible to verify whether the protected data has been altered by (a) decrypting the digital signature with the public key, and (b) comparing the decrypted signature with the known hashing function of the protected data to be verified. If the two are not identical, then the protected data has been altered. Because the digital signature of the protected data is produced with a private key, it is theoretically extremely difficult or impossible for the interloper to forge the digital signature, even if he can forge the protected data. Thus, a digital signature mechanism provides a means for detecting alterations of protected data (while not necessarily preventing alteration of the protected data).

Although digital signatures provide one useful means for detecting alteration, the arms race continues, and it must be assumed that interlopers will attempt to circumvent this and other mechanisms for protecting system integrity. Continued secure and correct operation of computer systems requires constant vigilance, and in particular, requires that potential avenues of attack be anticipated in advance, and appropriate countermeasures taken. Anticipating such potential avenues of attack is a difficult and demanding art.

SUMMARY OF THE INVENTION

A computer system contains one or more vital data components, the vital data components being protected by a detection mechanism for detecting unauthorized alteration (which is preferably in the form of one or more respective digital signatures to detect unauthorized alteration). A vital data validation mechanism is provided to verify that vital data components have not been tampered with. The vital data validation mechanism not only verifies that each vital data component is the same as it should be (preferably, by decrypting the digital signature in the conventional fashion), but also checks an alteration log to verify that no alterations have been made to the corresponding memory locations. Unlike a conventional verification of a digital signature or other comparing means, the second verification is intended to detect whether a vital data component has been altered temporarily, and then restored to its initial state.

In the preferred embodiment, the system includes a low-level patch function which can be used to patch data in arbitrary memory locations, and which is among the vital data protected by a digital signature. The patch function exists for performing system maintenance, and is normally intended for use only by a system administrator or similarly privileged user. The patch function automatically generates a log of alterations performed using the patch function. The alteration log generated by the patch function is checked by the vital data validation mechanism to verify that vital data has not been altered. Since it is possible to patch the alteration log and/or the patch function itself, the vital data validation mechanism also checks the alteration log and digital signature of the patch function to determine whether these have been tampered with.

Preferably, a vital data validation mechanism is loaded from a trusted source immediately prior to each use, to assure that the vital data validation function itself has not been tampered with. Alternative methods for verifying the validation mechanism are possible.

If a digital signature alone is checked, it may be possible for an interloper to gain access to the patch function, patch vital data for purposes of compromising some system element, and then removing the patch to mask what has happened. By checking an alteration log in addition to checking the digital signature of vital data components in accordance with the preferred embodiment, it is substantially more difficult to defeat system security by patching and removing a patch as above described. Thus a potential security exposure is reduced.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
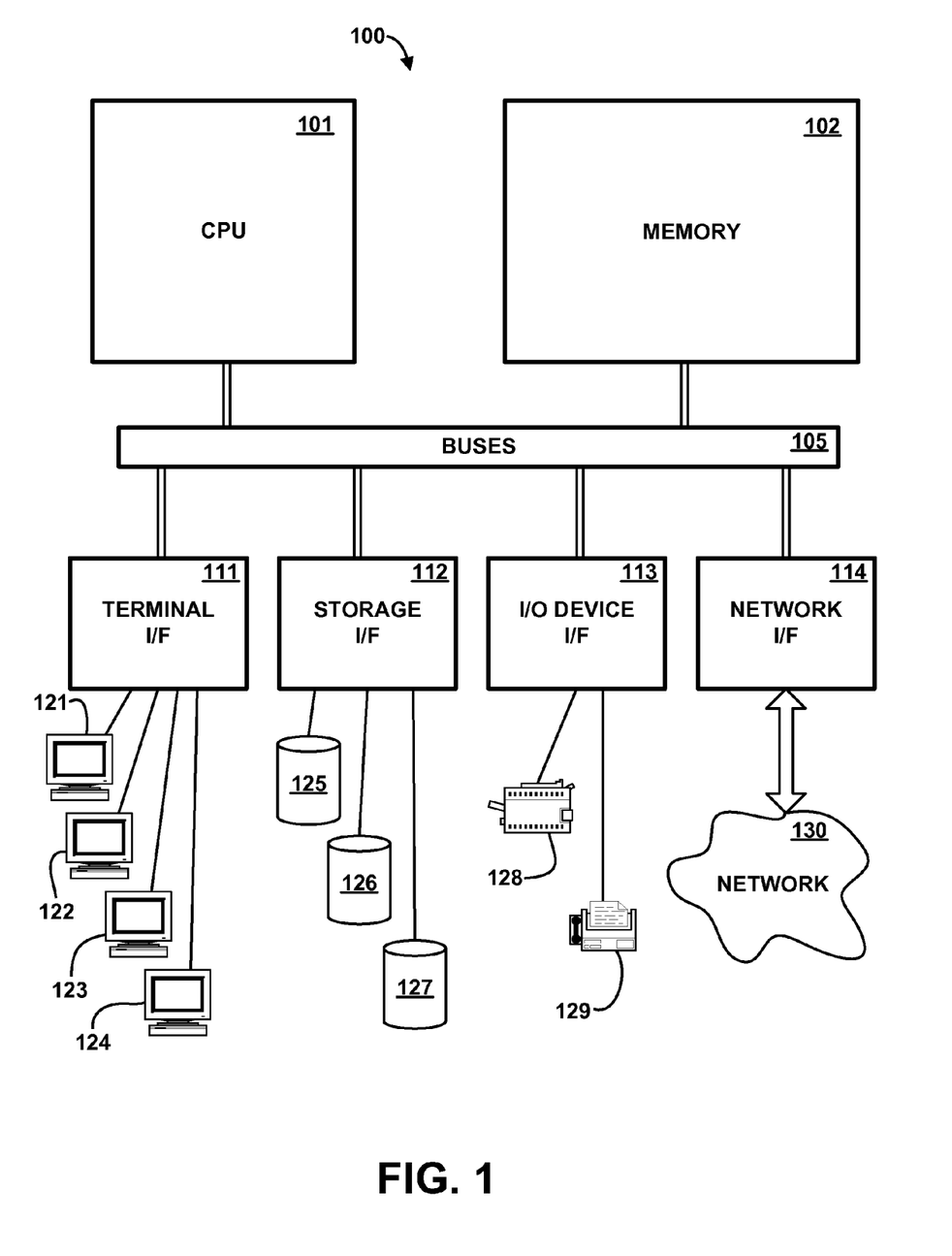
FIG. 1 is a high-level block diagram of the major hardware components of a computer system which uses a vital data validation mechanism, according to the preferred embodiment of the present invention.

Referring to the Drawing, wherein like numbers denote like parts throughout the several views, FIG. 1 is a high-level representation of the major hardware components of a computer system 100 which uses verifies certain vital data, according to the preferred embodiment of the present invention. CPU 101 is a general-purpose programmable processor which executes instructions and processes data from main memory 102. Main memory 102 is preferably a random access memory using any of various memory technologies, in which data is loaded from storage or otherwise for processing by CPU 101.

One or more communications buses 105 provide a data communication path for transferring data among CPU 101, main memory 102 and various I/O interface units 111-114, which may also be known as I/O processors (IOPs) or I/O adapters (IOAs). The I/O interface units support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O device interface unit 113 supports the attachment of any of various other types of I/O devices, such as printer 128 and fax machine 129, it being understood that other or additional types of I/O devices could be used. Network interface 114 supports a connection to an external network 130 for communication with one or more other digital devices. Network 130 may be any of various local or wide area networks known in the art. For example, network 130 may be an Ethernet local area network, or it may be the Internet. Additionally, network interface 114 might support connection to multiple networks.

It should be understood that FIG. 1 is intended to depict the representative major components of system 100 at a high level, that individual components may have greater complexity than represented in FIG. 1, that components other than or in addition to those shown in FIG. 1 may be present, and that the number, type and configuration of such components may vary, and that a large computer system will typically have more components than represented in FIG. 1. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although communications buses 105 are shown in FIG. 1 as a single entity, in fact communications among various system components is typically accomplished through a complex hierarchy of buses, interfaces, and so forth, in which higher-speed paths are used for communications between CPU 101 and memory 102, and lower speed paths are used for communications with I/O interface units 111-114. Buses 105 may be arranged in any of various forms, such as point-to-point links in hierarchical, star or web configurations, multiple hierarchical buses, parallel and redundant paths, etc. For example, as is known in a NUMA architecture, communications paths are arranged on a nodal basis. Buses may use, e.g., an industry standard PCI bus, or any other appropriate bus technology. While multiple I/O interface units are shown which separate buses 105 from various communications paths running to the various I/O devices, it would alternatively be possible to connect some or all of the I/O devices directly to one or more system buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might also be attached to and communicate with system 100 over network 130. Computer system 100 may alternatively be a single-user system, typically containing only a single user display and keyboard input. Furthermore, while the invention herein is described for illustrative purposes as embodied in a single computer system, the present invention could alternatively be implemented using a distributed network of computer systems in communication with one another, in which different functions or steps described herein are performed on different computer systems.

While various system components have been described and shown at a high level, it should be understood that a typical computer system contains many other components not shown, which are not essential to an understanding of the present invention. In the preferred embodiment, computer system 100 is a computer system based on the IBM i/Series™ architecture, it being understood that the present invention could be implemented on other computer systems.

Figure 2:
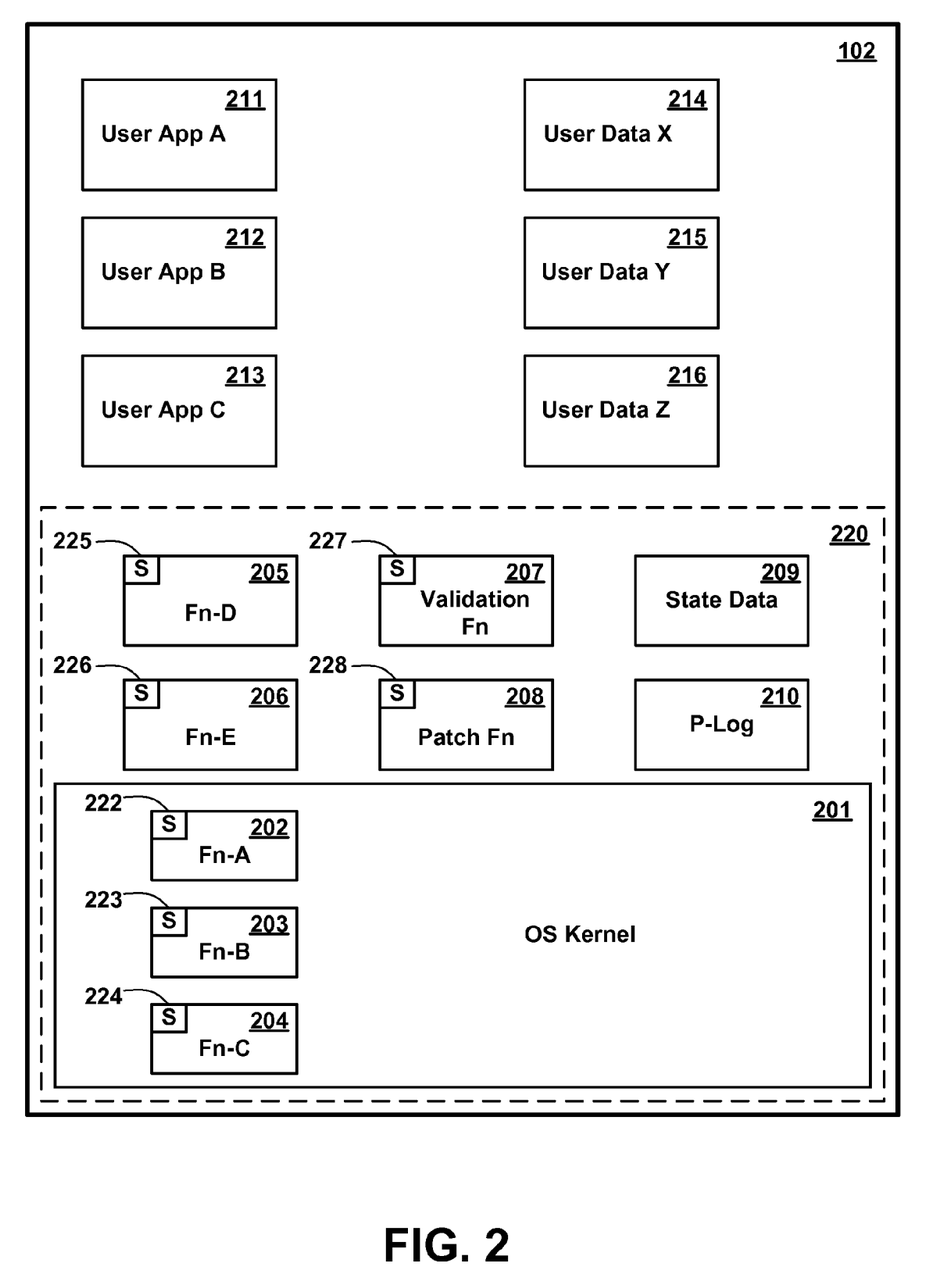
FIG. 2 is a conceptual illustration of the major software components of a computer system which uses a vital data validation mechanism, according to the preferred embodiment.

FIG. 2 is a conceptual illustration of the major software components of system 100 in memory 102. A portion of memory is designated protected memory 220; various mechanisms prevent ordinary user processes from writing to protected memory, and in this area certain vital data is stored. Protected memory may be a fixed or a variable-sized area of memory, and although illustrated as a single contiguous area in FIG. 2, it need not be contiguous.

Within protected memory 220 are stored executable code modules and certain other vital data components, which should only be written to by a controlled process or under special authority, and should not be written to by ordinary user processes. A vital data component is any data entity which, if corrupted, could generally affect the integrity of system operations, and which is therefore kept in protected storage. Any of various hardware and/or software protection mechanisms, now known or hereafter developed, can be used to prevent ordinary user processes from writing to protected storage.

Operating system kernel 201, stored in protected memory 220, is executable computer program code providing various low-level software functions, such as device interfaces, management of memory pages, etc. In particular, operating system 201 is preferably a multi-tasking operating system which supports the concurrent execution of multiple active tasks and the sharing of system resources among those tasks, as is well-known in the art. Various mechanisms within the operating system allow multiple tasks (preferably executing on behalf of multiple users) to share system resources, and enforce data integrity and security among the multiple tasks, preventing one task from accessing data belonging to another task in an unauthorized manner. For example, one or more dispatchers regulate access to CPU(s) 101, paging and memory mapping mechanisms allocate space in memory 102, etc. Functional modules 202-204 may represent any of various executable code modules which perform vital functions of operating system 201, such as memory mapping, pointer verification, access authorization, etc. FIG. 2 illustrates three representative functional modules 202-204 within operating system 201, it being understood that the number of such modules may vary, and is typically larger.

Additional functional modules or applications 205-208 outside the operating system kernel are executable code modules for performing auxiliary functions. For example, compilers which generate executable code, or functions for handling user login and passwords, just to name a few, might fall into this category. In particular, additional functional modules include a validation function module 207 and a patch function module 208, described in greater detail herein.

Protected storage may also include various state data structures 209-210 which are intended to be written to, but only under controlled circumstances, and not by ordinary user processes. Such state data may include call-return stacks, dispatch queues, memory maps, page tables, etc. In particular, state data includes a P-log 210, which is a log of alterations made using patch function module 208, and is described in greater detail herein. Although FIG. 2 represents a single state data entity 209 other than P-log 210, it will be understood that the number of such entities is typically much larger, and that such entities may be within or without OS Kernel 201.

In addition to being stored in protected storage 220, certain vital data components, including particularly executable code modules 202-208, are additionally protected by a digital signature. A digital signature is an alteration detection mechanism, which makes it possible to detect unauthorized alterations to a module. As shown in FIG. 2, each of modules

202-208 contains a corresponding digital signature 222-228. The data which is encrypted is preferably a known hash function of the actual module or some part (such as the object code) thereof, which may or may not include attribute or other header information from the component. The digital signature is used by validation function 207 to verify that the module has not been tampered with, as described in greater detail herein.

By way of background, a digital signature is an encryption of data derived from some data being "signed" using a public/private key encryption algorithm. Various such algorithms exist today and are known in the art. Any such algorithm or algorithms, now known or hereafter developed, could be used consistent with the present invention, the exact choice of algorithm depending on various design considerations.

These algorithms have the characteristic that they perform a one-way data transformation using a key. By "one-way" it is meant that it is not algorithmically feasible to perform a reverse data transformation to obtain the original data, having only the transformed data and the key used to construct it. However, it is possible to perform a reverse data transformation with a second key. The two keys therefore form a pair, with which it is possible to perform a complete transformation and reverse transformation of data.

The one-way nature of the data transformations necessarily implies that it is not algorithmically feasible to obtain one key from the other, for if it were, it would be possible to perform the reverse data transformation by simply generating the other key. However, since there must be a way to generate the two keys initially, a further characteristic of a public/private key encryption algorithm is that it is possible to algorithmically generate a pair of keys. The key generation algorithm itself requires some input data (a seed), so that it will not always generate the same key pair. Typically, this is accomplished by seeding a key generation algorithm with a random number.

Public/private key encryption algorithms are commonly used to encrypt and decrypt data (including encryption keys for data) being transmitted over or stored in an unsecure medium. In this environment, the key used to encrypt the data is called a public key, because it need not be protected, and multiple copies of it can be distributed. A person in possession of the public key can only encrypt, and can not decrypt, data. The private key is available only to persons having a need to decrypt the data, usually a single person. Thus, almost anyone might be able to generate an encrypted version of some data, but only the holder of the private key can read such data.

These algorithms can, however, be used in a different mode, in which the private key is used to generate the encrypted version of the data, while the public key is used to decrypt it. Obviously, such a usage is not intended to protect the data from being read, since anyone with the public key can decrypt and read the data. This usage is intended to authenticate data. The encrypted version of the data is referred to as a digital signature, and it normally accompanies a plain text version of the data to authenticate the plain text version. Since only the originator of the data has the private key, only the originator can generate an encrypted version, i.e., generate a digital signature. By performing the reverse transformation (decryption) with the public key and comparing the decrypted data to the plain text version, anyone can verify that the plain text version is the same as what the originator had encrypted in the digital signature. Thus data is protected from alteration, as opposed to access, by third parties. Unless the data being authenticated by a digital signature is very brief, it is common to generate a digital signature from a hashing of the data, since an encryption of the entire data may result in unreasonably large digital signatures.

As used above, "algorithmically feasible" refers to the capability to perform an act (in this case, a data transformation) using a known algorithm which is guaranteed to, or which will in general, complete in a reasonable time. In the mathematical sense, it is possible to break any code by systematically generating every possible key combination, but the number of keys is usually sufficiently large to make this impractical. There may be other codebreaking heuristics which are beyond the scope of the present disclosure. Additionally, a hash function is always a reduction of data, and so the mere fact that the hashed derivation of data matches something is not a mathematical proof of identity. But for a properly chosen hash function, the probability that a data alteration will result in exactly the same hash function is minuscule. The detection mechanisms described herein are not necessarily impossible to circumvent, but are intended to make circumvention extremely difficult. No encryption algorithm, detection technique, or other security mechanism can claim to forever defeat the ingenuity of potential interlopers, but these techniques can make it enormously difficult to compromise protected data without detection.

Preferably, an authorized provider of the vital data component (such as a system manufacturer or software house which provides software) generates the corresponding digital signature using a private key known only to it, and provides the vital data component with its digital signature to the user system. If a vital data component must be altered (to correct a defect or release a new version), the authorized provider generates a new version of the vital data component with a new digital signature.

Software components of system 100 may further include one or more user application computer programs 211-213, of which three are shown for illustrative purposes in FIG. 2, it being understood that this number may vary. User applications 211-213 may include any of various applications, now known or hereafter developed, for performing useful work on a computer system, such as accounting, word processing, calendaring, process control, etc. One or more of user applications 211-213 may access external user data files 214-216, of which three are represented in FIG. 2, it being understood that the number of such files could be much larger. Data files 214-216 could include structured databases which are accessed using any of various database search and maintenance tools, as are known in the art, or could include text files, source code files, log files, or any of various other forms of user data. In general, user applications 211-213 and user data 214-216 are not considered vital data components and are not protected by the validation mechanism described herein. The reason for this is that various operating system mechanisms constrain user applications and user data to particular address spaces or address ranges and restrict the operations that user applications can perform, so that even if a particular user application or user data file contains malicious code or is otherwise corrupted, it should not be able to affect system integrity in general.

Various software entities are represented in FIG. 2 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representation of FIG. 2, it will be understood that the actual number of such entities may vary, and in particular, that in a complex digital data processing environment, the number and complexity of such entities is typically much larger. Additionally, although software components 201-216 are depicted in FIG. 2 on a single computer system 100 for completeness of the representation, it is not necessarily true that all programs, functions and data will be present on a single computer system or will be performed on a single computer system. For example, a validation module as described herein could be present on a different system and perform validation remotely.

While the software components of FIG. 2 are shown conceptually as residing in memory 102, it will be understood that in general the memory of a computer system will be too small to hold all programs and data simultaneously, and that information is typically stored in data storage devices 125-127, comprising one or more mass storage devices such as rotating magnetic disk drives, and that the information is paged into memory by the operating system as required. Furthermore, it will be understood that the conceptual representation of FIG. 2 is not meant to imply any particular memory organizational model, and that system 100 might employ a single address space virtual memory, or might employ multiple virtual address spaces which overlap.

Patch function module 208 is executable code which performs an editing function to edit arbitrary locations in memory 102 of computer system 100. In particular, patch function 208 has the capability to edit locations in protected memory 220. The patch function is preferably implemented as a simple interactive editor, in which a user specifies a particular address or range of addresses, and is allowed to interactively edit data at the specified addresses by replacing current data contents with arbitrarily specified data values. Patch function 208 exists for the purpose of supporting maintenance of computer system 100. It is often useful to have the capability to edit arbitrary memory locations for any of various reasons. For example, it may be useful to set a variable to some value for purposes of diagnosing a software application. Similarly, it may be useful to temporarily by-pass a section of code which is causing a problem, not yet analyzed or perfectly understood. It may be also useful to restore a data value which was corrupted to a correct state.

Because patch function 208 is intended to support maintenance operations, which are out of the ordinary, there are no restrictions on the memory locations which can be edited with the patch function or the values which may be placed in those memory location. Obviously, such unrestricted capability carries with it the potential to cause enormous mischief. Therefore, the patch function is typically unavailable for use by ordinary users of system 100, and requires special authorization (such as system administrator or the like) for access to its capabilities.

Figure 3:
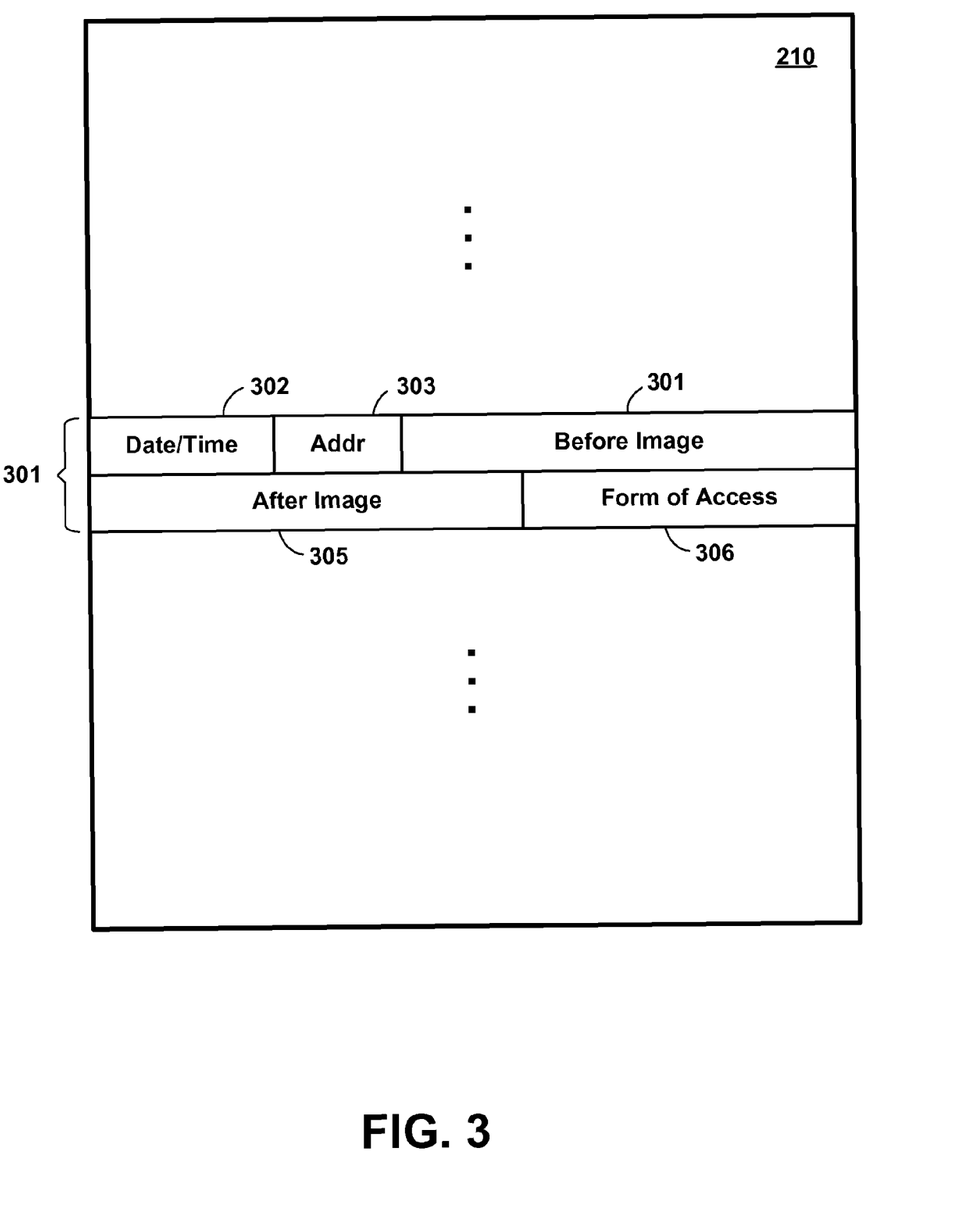
FIG. 3 is a conceptual representation of the structure of patch log 210, according to the preferred embodiment.

Patch function 208 maintains a record of its activities in the form of patch log 210. Patch log 210 is a log structure, i.e., a collection of log entries, each entry corresponding to some activity, in this case, a change made to a location in memory using patch function 208. FIG. 3 is a conceptual representation of the structure of patch log 210, according to the preferred embodiment.

Referring to FIG. 3, patch log 210 comprises a variable number of entries 301, each entry recording a single corresponding change (patch) to memory which was made using patch function 208. Preferably, each log entry 301 contains data sufficient to identify the nature of the patch made to memory. Specifically, each entry contains a date/time field 302 indicating the date and time at which the change was made; an address range which was altered 303; a before image of the altered memory 304, i.e. an exact copy of the data in the memory locations which were altered, immediately before the alteration; an after image of the altered memory 305, i.e. an exact copy of the data in the memory locations which were altered, immediately after the alteration; and form of access data 306, i.e., a record, to the extent possible, of how access to the patch function was obtained, such as the user identifier of an authorized user, or a service console or other special hardware device if access is obtained in that fashion.

In the preferred embodiment, patch function 208 automatically maintains patch log 210 by automatically generating a patch log entry 301 every time a patch is made to a memory location, and adding the patch log entry to patch log 210. Thus, patch log is simply a record which grows and accumulates entries over time. Typically, patches are expected to be relatively unusual events, and the amount of memory patched in each case relatively small, so that it is practical to simply accumulate a record of all such patches in a single patch log. The log may be archived periodically if its size becomes unwieldy.

Although patch log 210 is represented in FIG. 3 as a single entity, such patch trace data could be arranged in a complex data structure or multiple structures, which are not necessarily contiguous in memory.

As explained previously, proper system security requires that potential avenues of attack be anticipated in advance, even if they haven't necessarily been employed in the past. In general, patch function 208 is not intended for use in patching vital data components. Changing any of the data in a vital data component necessarily invalidates the digital signature. If a defect is discovered in a vital data component, a new vital data component is typically generated at the source (such as a manufacturer of system 100), along with a new digital signature. However, since the patch function can patch any arbitrary memory location, there is nothing to prevent an authorized user, having access to the patch function, from altering a vital data component. In theory, anyone with access to the patch function is a "trusted" user, but it should be anticipated that such a patch function could be subject to abuse, either by an unauthorized person gaining access to it in some unforeseen manner, or because a properly authorized person turns out to have been untrustworthy.

If one anticipates that a patch function could be misused to alter a vital data component, then the conventional response is to detect such alteration using the digital signature. I.e., the digital signature of the vital data component is decrypted and compared with a hash of the vital data component from which the digital signature was originally encrypted. If the two compare, then it can be assumed that the vital data component is exactly what it is supposed to be; if they do not compare, then the vital data component has been altered.

Such a check of the digital signature is a useful detection technique for detecting a security breach. But it fails to account for or detect one particular exposure. If an interloper were to patch a vital data component, then use the patched vital data component to perform some unauthorized operation, and then re-patch the vital data component to its original state, a check of the digital signature of the vital data component after it had been returned to its original state would detect nothing amiss.

In order to anticipate this particular exposure, a validation function in accordance with the preferred embodiment includes a check of the patch log to determine whether any vital data components have been patched. This is performed in addition to a check of the digital signatures of the vital components.

Figure 4A:
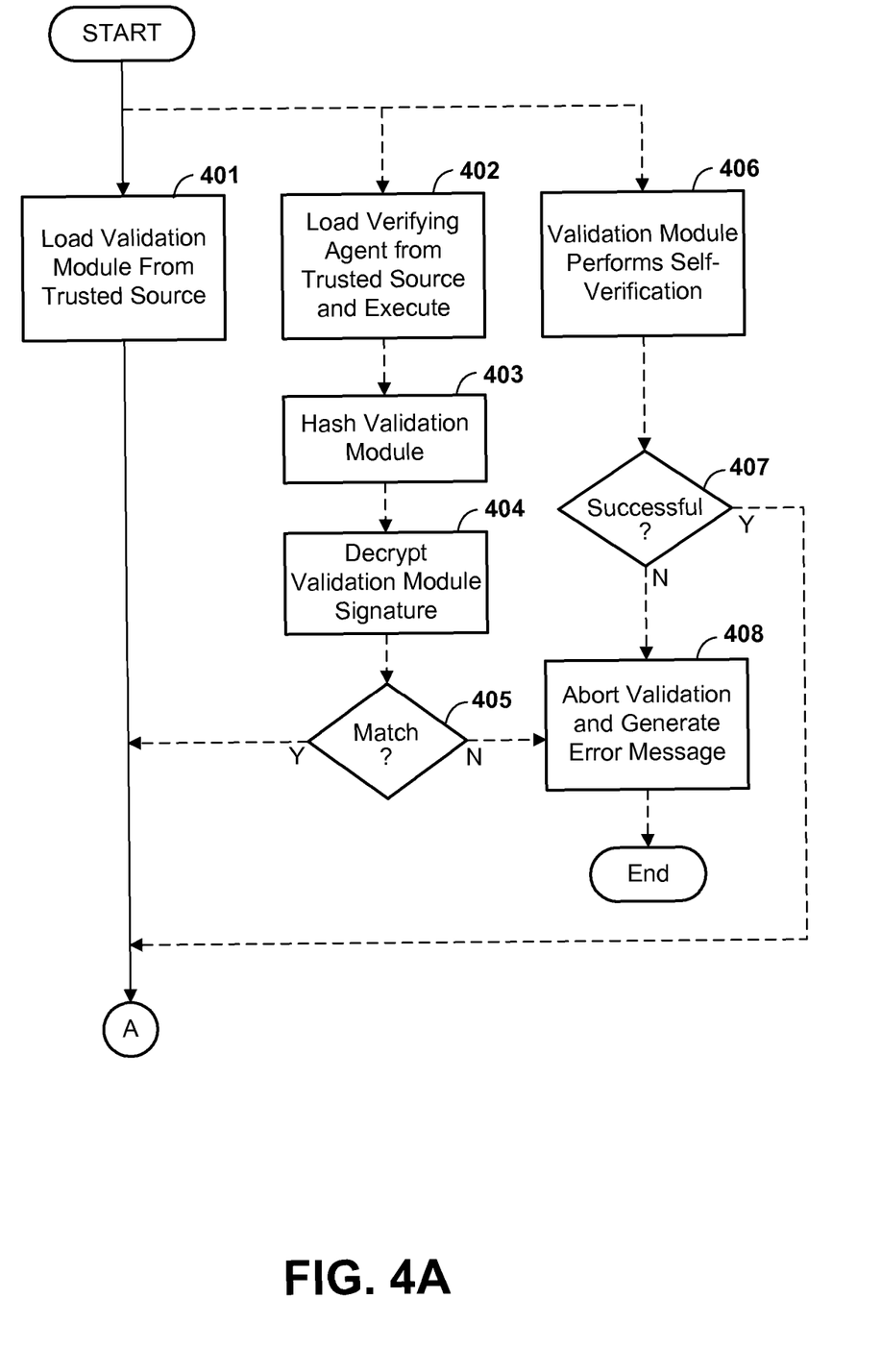
FIGS. 4A-4C (herein collectively referred to as FIG. 4) are a flow diagram showing a process of verifying one or more vital data components, according to the preferred embodiment.
Figure 4B:
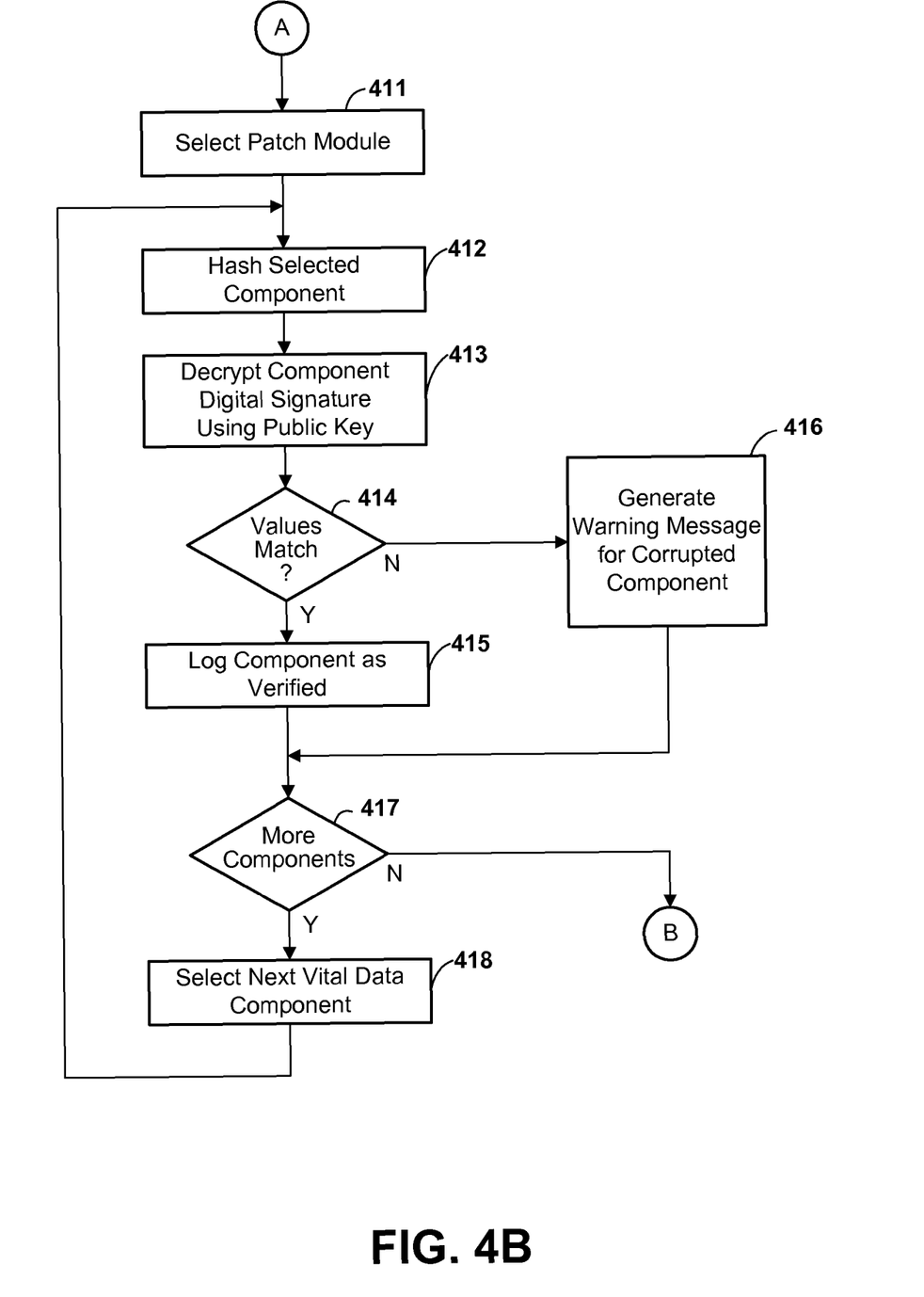
Figure 4C:
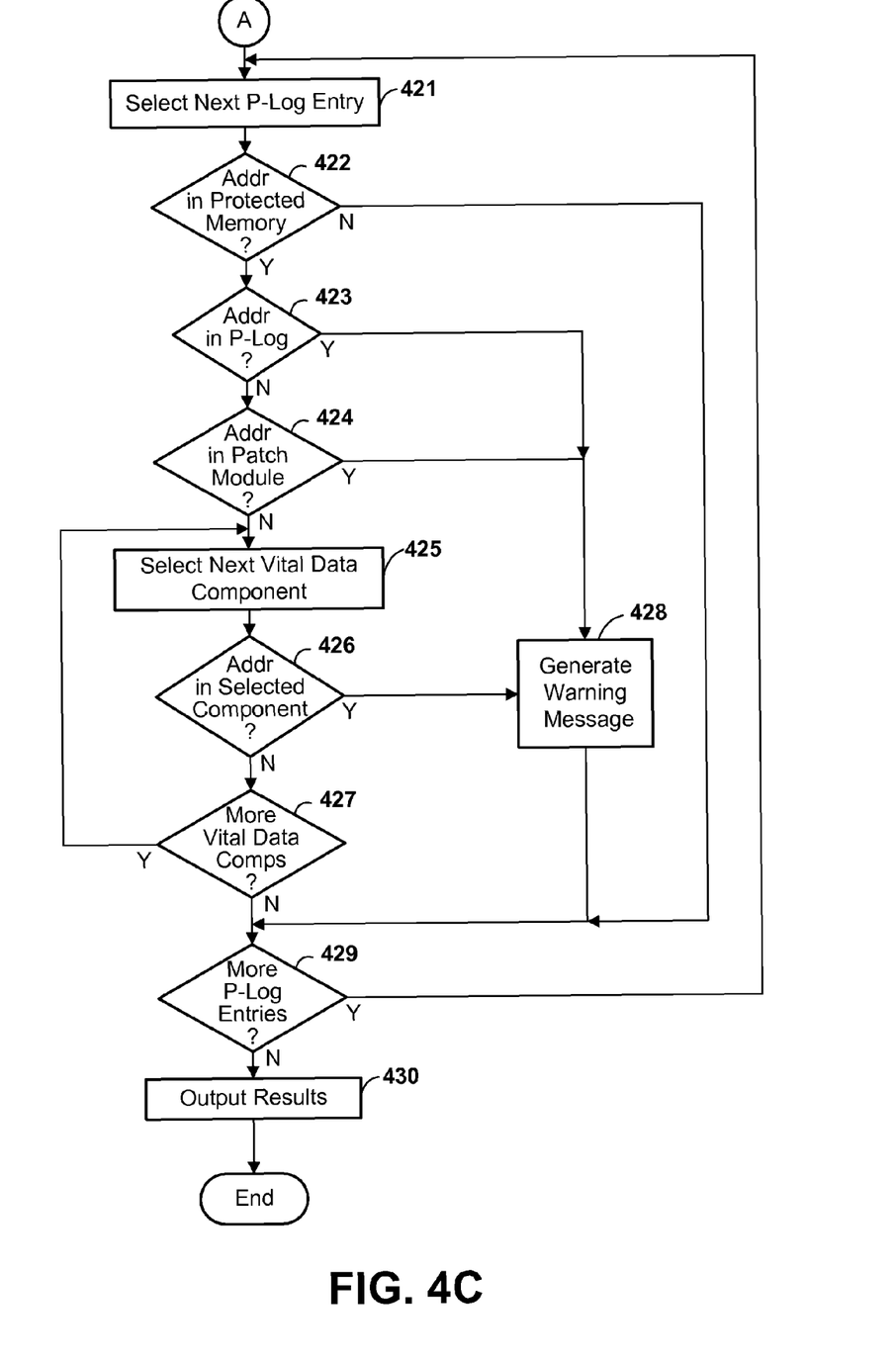

FIGS. 4A-4C (herein collectively referred to as FIG. 4) are a flow diagram showing a process of verifying one or more vital data components, according to the preferred embodiment. A validation process is performed by software, i.e., by something which is itself data potentially subject to corruption. The integrity of the validation process can not be assured unless it can be known that the software which executes the validation process (i.e., validation function module 208) has not itself been corrupted. Therefore the first step is to assure, insofar as practical, that validation function module 208 is correctly functioning to perform the validation function.

Referring to FIG. 4, the integrity of the validation function module can be verified in any of several ways. In a preferred embodiment, a new validation function module is obtained and loaded onto system 100 from a trusted source (step 401). A trusted source might be, for example, a web site of a trusted software provider, from which a copy of the validation function module is downloaded immediately prior to performing vital data component verification, each time such vital data component verification is performed. A trusted source might alternatively be a read-only storage medium (such as a CD-ROM) which is kept in a secure place, and from which the validation function is loaded onto system 100 every time vital data component verification must be performed.

As an alternative, the validation function module might be verified by loading a separate verifying agent from a trusted source (step 402) and executing the agent. A trusted source for the agent might be anything which is a trusted source for the validation module, as explained above. Upon execution, the agent performs a hash of the validation function module using the hash function which was used to encrypt its digital signature (step 403), and decrypts the signature of the validation function module (step 404). These two results are then compared (step 405), and if identical, the validation function module is considered verified (represented as the 'Y' branch from step 405). If the results do not compare (the 'N' branch from step 405), the validation module can not be relied upon. In this case, further attempts to execute the validation module are not performed, and a warning message is issued (step 408). The advantage of using an agent as depicted in steps 402-405 is that the agent is likely to be smaller, and updated less frequently, that the validation function module. In particular, if the "trusted source" is a read-only storage medium, it is desirable to store an agent which is unlikely to be updated frequently, obviating the need to replace the read-only storage medium.

As an additional alternative, the validation function module might verify itself, represented as step 406. Self-verification might involve the same method performed by the agent and described above with respect to steps 403-404, or might involve other or additional actions. For example, self-verification may involve multiple instances of checking the signature or setting values in memory which are checked multiple times. Any technique, now known or hereafter developed, for self-verification may be used. If self-verification is successful, the 'Y' branch is taken from step 407 and the validation function continues to execute; if not, the validation function aborts and an error message is generated to the user (step 408).

It will be understood that self-verification has the inherent limitation that it relies to at least some degree on the integrity of the thing being verified, which is not known in advance to be uncorrupted. Whatever self-verification technique is used, it is theoretically possible for an interloper to alter the validation module in such as way as it would appear to verify itself, and thus mask any alterations. Self-verification techniques which perform verification multiple times or set complex values in multiple memory locations may make it more difficult to alter the validation module without detection, but they do not necessarily prevent all such alterations. For this reason, it is preferred that either the validation function module or a verifying agent be loaded from a trusted source, as described above.

After the integrity of the validation module itself is verified using any of the techniques described above, the validation module verifies the digital signatures of one or more vital data components, represented as steps 411-418. In the preferred embodiment, the validation module can execute a check of all vital data components in system 100, or can check a selected single component. The former check might be performed at intervals on a routine basis, as part of normal system maintenance. A check of a specific vital data component might be performed responsive to some specific reason to believe that the component may have been compromised.

Referring again to FIG. 4, regardless of the number of vital data components to be checked, the patch function module 208 should always be checked in addition, and is therefore selected for checking first (step 411). The patch function should be checked because, if altered, changes could be made to a vital data component without a corresponding trace entry being placed in P-log 210. The vital data components (other than the patch module) which are to be checked are selected for verification later at step 418.

With respect to the selected component, the validation function generates a hash of the vital data component (or some part thereof, such as the object code) using a known hash function which was used to generate the original digital signature (step 412). The validation function also decrypts the digital signature using a public decryption key (step 413). The hash function value generated at step 412 is then compared to the decrypted digital signature generated at step 413. If the two values are identical, then the vital data component matches its digital signature and is assumed to be unaltered. In this case, the 'Y' branch is take from step 414, and an appropriate entry is appended to an output log of vital data components which were successfully verified (step 415). If the values are not identical, the vital data component has been corrupted, and the 'N' branch is taken from step 414 to generate an appropriate warning message to the user (step 416). In either case, if any more vital data components remain to be analyzed, the 'Y' branch is taken from step 417, a next vital data component is selected for verification at step 418, and steps 412-417 are repeated. When the digital signatures of all components have been thus analyzed, the 'N' branch is taken from step 417.

The validation function then accesses P-log 210 to verify that there have been no alterations to any of the vital data components using patch module 208. As explained previously, the purpose of checking the P-log is to identify a possible exposure where a vital data component has been altered, and then later returned to its original state. In this circumstance, a verification of the digital signature as performed in steps 411-418 will not detect anything amiss, because the component, having been restored to its original state, will match its digital signature. However, because the vital data component was temporarily altered, untold mischief could have been caused during the interval that the vital data component was incorrect. The mere fact that the vital data component was altered, and then returned to its original state, may indicate some attempt to cover up improper activities.

The validation function therefore reviews each entry 301 in P-log 210 in sequence. At step 421, a next entry 301 from the P-log is selected. If the address range (in field 303) of the P-log entry is outside protected memory 220, then there is no need to further examine the entry, and the 'N' branch is taken from step 422, to step 429. If the address range is inside protected memory 220, then the 'Y' branch is taken from step 422, to further examine the entry.

The address in the P-log entry is compared to the address range of the P-log itself (step 423). Checking against the address range of the P-log is necessary because one could theoretically patch the P-log to remove evidence of tampering. However, even if the P-log is patched using patch function 208, an entry will be made to the P-log after the edit, which reflects that the P-log has been altered. Thus, telltale evidence of the alteration will exist in the P-log, although, depending on the depth of alteration, it will not necessarily be possible to reconstruct everything in the P-log before the alteration. If the address in the P-log entry is within the P-log itself, the 'Y' branch is taken from step 423, and an appropriate warning message is generated (step 428); if the address in the P-log entry is not a location in the P-log, the 'N' branch is taken from step 423.

The address in the P-log entry is compared with the address range of patch module 208 (step 424). The reason for this comparison is similar to checking the P-log itself above. If the patch module had been altered, e.g. to disable logging in the P-log, then it would have been possible to patch vital data components without leaving traces in the P-log. If the address in the P-log entry is within the patch module, the 'Y' branch is taken from step 424, and an appropriate warning message is generated (step 428); if the address in the P-log entry is not a location in the patch module, the 'N' branch is taken from step 424.

The address in the P-log entry is then compared to the address range of each vital data component to be validated, i.e. each of vital data components which was selected earlier at step 418. At step 425, a next vital data component is selected. If the address of the P-log entry is within the vital data component, the 'Y' branch is taken from step 426, and an appropriate warning message is generated (step 428). Otherwise, the 'N' branch is taken to step 427. If any more vital data components remain to be compared to the P-log entry, the 'Y' branch is taken from step 427, and a next component selected at step 425. When all vital data components have been compared to the P-log entry, the 'N' branch is taken from step 427.

If any more P-log entries remain to be examined, the 'Y' branch is taken from step 429, and a next P-log entry is selected at step 421. When all P-log entries have been thus examined, the 'N' branch is taken from step 429. The validation function then outputs results to the user, such as a list of modules validated and a list of any warning messages generated (step 430).

Generally, it is expected that very few if any P-log entries will reference addresses in protected memory, and so the 'N' branch from step 422 is almost always taken. As described herein, a warning message is generated only if the P-log entry references one of the vital data components being verified (which might be only a single component), or if it references the P-log or patch module, either of which could be altered to hide improper activity with respect to another vital data component. Thus, if an P-log entry references a location in protected memory other than the vital data component(s) being verified (or the P-log or patch module), no warning is generated. The alternative allows the user to selectively filter warnings for specific components or groups of components. It would alternatively be possible to generate a warning message any time the P-log entry contains a reference to protected storage.

Although a particular verification algorithm is described above and represented in FIG. 4, it will be understood that various alternative implementations are possible. In particular, depending on the architecture involved and supporting security structures provided, other or additional vital data components may need to be verified. Furthermore, although verification steps are performed in a particular order in FIG. 4, it will be appreciated that various steps could have been performed in a different sequence, that some steps may be unnecessary in some environments, and that additional steps may be desirable in some environments.

It will be observed that the P-log depends on patch module 208 to append entries to it corresponding to changes to memory locations, and the patch module performs this function, transparently to the user, whenever it is used to alter memory. It may be theoretically possible for an interloper to generate his own patch module, without any capability to trace its activities, and use it to patch arbitrary memory locations. However there are other data protection mechanisms of system 100 which are intended to prevent any such unauthorized user access to protected memory, and preventing this form of access is considered beyond the scope of the present disclosure. Ultimately, any security mechanism has inherent limitations, and protects against some limited form of attack. The present invention is intended to foreclose particularly an exposure in the form of patching and removing a patch using patch module 208.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of computer-readable media used to actually carry out the distribution. Examples of computer-readable media include, but are not limited to, media such as volatile and non-volatile memory devices, floppy disks, hard-disk drives, CD-ROM's, DVD's, magnetic tape, and so forth. Moreover, the invention applies to any form of computer-readable media in which a program product is stored either at its source, destination, or intermediate location, regardless of the form of distribution, and in particular even where distributed using communications links, including wireless communications links, which do not involve a physical transfer of tangible media. Examples of computer-readable media are illustrated in FIG. 1 as system memory 102, and as data storage devices 125-127.

Although a specific embodiment of the invention has been disclosed along with certain alternatives, it will be recognized by those skilled in the art that additional variations in form and detail may be made within the scope of the following claims.

What is claimed is:

1. A method for detecting alteration of vital data in a computer system, comprising the computer-executed steps of:

verifying whether a current state of at least one vital data component is correct, there being a predefined correct state for said at least one vital data component;

identifying past alterations to said at least one vital data component wherein said at least one vital data component is altered from said predefined correct state to an incorrect state, and subsequently returned to said predefined correct state in circumstances wherein said current state is correct, said identifying step using at least one historical record; and presenting results of said verifying and identifying steps to a user.

2. The method for detecting alteration of vital data of claim 1, wherein said step of verifying whether a current state of at least one vital data component is correct comprises the steps of:

obtaining a respective digital signature associated with each said vital data component;

decrypting each said digital signature; and comparing each respective decrypted digital signature to data derived from said current state of the associated vital data component.

3. The method for detecting alteration of vital data of claim 1, wherein said at least one historical record comprises a log of alterations made using a memory editing function.

4. The method for detecting alteration of vital data of claim 3, further comprising the computer-executed step of:

identifying memory editing operations made to said log of alterations using said memory editing function.

5. The method for detecting alteration of vital data of claim 3, further comprising the computer-executed steps of:

verifying a current state of at least one component embodying said memory editing function;

identifying alterations to said at least one component embodying said memory editing function, said identifying step using at least one historical record.

6. The method for detecting alteration of vital data of claim 1, further comprising the step of:

verifying a current state of at least one executable code module for automatically performing said steps of verifying whether a current state of at least one vital data component is correct, identifying past alterations to said at least one vital data component, and presenting results to a user.

7. The method for detecting alteration of vital data of claim 6, wherein said step of verifying a current state of at least one executable code module for automatically performing said steps of verifying whether a current state of at least one vital data component is correct, identifying past alterations to said at least one vital data component, and presenting results to a user, comprises the step of:

loading said at least one executable code module for automatically performing said steps of verifying a whether current state of at least one vital data component is correct, identifying past alterations to said at least one vital data component, and presenting results to a user, from a trusted source, said loading step being performed immediately before executing said at least one executable code module for automatically performing said steps of verifying whether a current state of at least one vital data component is correct, identifying past alterations to said at least one vital data component, and presenting results to a user.

8. The method for detecting alteration of vital data of claim 6, wherein said step of verifying a current state of at least one executable code module for automatically performing said steps of verifying whether a current state of at least one vital data component is correct, identifying past alterations to said at least one vital data component, and presenting results to a user, comprises the steps of:

loading at least one verifying agent to said computer system from a trusted source; and executing said verifying agent to verify a current state of said at least one executable code module for automatically performing said steps of verifying whether a current state of at least one vital data component is correct, identifying past alterations to said at least one vital data component, and presenting results to a user.

9. A computer program product for detecting alteration of vital data in a computer system, comprising:

a plurality of computer-executable instructions recorded on non-transitory computer-readable media, wherein said instructions, when executed by at least one processor of a digital computing device, cause the device to perform the steps of:

verifying whether a current state of at least one vital data component is correct, there being a predefined correct state for said at least one vital data component;

identifying past alterations to said at least one vital data component wherein said at least one vital data component is altered from said predefined correct state to an incorrect state, and subsequently returned to said predefined correct state in circumstances wherein said current state is correct, said identifying step using at least one historical record; and presenting results of said verifying and identifying steps to a user.

10. The computer program product of claim 9, wherein said step of verifying whether a current state of at least one vital data component is correct comprises the steps of:

obtaining a respective digital signature associated with each said vital data component;

decrypting each said digital signature; and comparing each respective decrypted digital signature to data derived from said current state of the associated vital data component.

11. The computer program product of claim 9, wherein said at least one historical record comprises a log of alterations made using a memory editing function.

12. The computer program product of claim 11, wherein said instructions, when executed by said at least one processor of said digital computing device, further cause the device to perform the step of:

identifying memory editing operations made to said log of alterations using said memory editing function.

13. The computer program product of claim 11, wherein said instructions, when executed by said at least one processor of said digital computing device, further cause the device to perform the steps of:

verifying a current state of at least one component embodying said memory editing function;

identifying alterations to said at least one component embodying said memory editing function, said identifying step using at least one historical record.

14. The computer program product of claim 9, wherein said computer program product contains at least one digital signature.

15. A digital data processing system, comprising:

at least one processor;

a memory storing executable instructions for execution on said at least one processor;

a plurality of vital data components storable in said memory, there being a respective predefined correct state for each vital component of said plurality of vital components;

a vital data alteration detection mechanism embodied as instructions storable in said memory and executable by said least one processor, said vital data alteration detection mechanism detecting (a) whether a current state of one or more said vital data components is correct, and (b) whether one or more said vital data components having a correct current state have previously been altered to an incorrect state and returned to a the respective predefined correct state.

16. The digital data processing system of claim 15, wherein a respective digital signature is associated with each said vital data component, and wherein said vital data alteration detection mechanism detects whether a current state of one or more said vital data components is correct by obtaining the respective digital signature associated with each said vital data component, decrypting each said digital signature, and comparing each respective decrypted digital signature to data derived from said current state of the associated vital data component.

17. The digital data processing system of claim 15, further comprising:

a memory editing function for editing memory locations including at least some locations within said vital data components, said memory editing mechanism creating a log of memory alterations made using said memory editing mechanism;

wherein said vital data alteration detection mechanism detects whether one or more said vital data components having a correct current state have previously been altered to an incorrect state and returned to the respective predefined correct state by examining said log of memory alterations made using said memory editing mechanism.

18. The digital data processing system of claim 17, wherein said memory editing mechanism is capable of editing memory locations within said log of memory alterations made using said memory editing mechanism; and wherein said vital data alteration detection mechanism detects whether said memory editing mechanism has been used to edit memory locations within said log of memory alterations.

19. The digital data processing system of claim 17, wherein said vital data alteration detection mechanism further determines whether a current state of said memory editing mechanism is correct, and (b) whether any component of said memory editing mechanism having a correct current state has previously been altered to an incorrect state and returned to a correct state.

20. The computer program product of claim 15, wherein said vital data alteration detection mechanism comprises one or more components, each having a respective digital signature.

21. The method for detecting alteration of vital data of claim 1, wherein said at least one vital data component comprises an executable code module.

* * * * *